United States Patent
Takamine et al.

(10) Patent No.: US 12,332,214 B2
(45) Date of Patent: Jun. 17, 2025

(54) STRUCTURE SOUNDNESS EVALUATION USING ELASTIC WAVES ON DIVIDED AREAS

(71) Applicants: Kabushiki Kaisha Toshiba, Tokyo (JP); Kyoto University, Kyoto (JP)

(72) Inventors: Hidefumi Takamine, Shinagawa (JP); Yuki Ueda, Yokohama (JP); Kazuo Watabe, Yokohama (JP); Tomoki Shiotani, Kyoto (JP); Katsufumi Hashimoto, Kyoto (JP)

(73) Assignees: Kabushiki Kaisha Toshiba, Tokyo (JP); Kyoto University, Kyoto (JP)

( * ) Notice: Subject to any disclaimer, the term of this patent is extended or adjusted under 35 U.S.C. 154(b) by 0 days.

(21) Appl. No.: 17/184,667

(22) Filed: Feb. 25, 2021

(65) Prior Publication Data
US 2021/0181157 A1   Jun. 17, 2021

Related U.S. Application Data

(63) Continuation of application No. PCT/JP2018/034004, filed on Sep. 13, 2018.

(51) Int. Cl.
*G01N 29/14* (2006.01)
*G01N 29/24* (2006.01)
*G01N 29/44* (2006.01)

(52) U.S. Cl.
CPC ......... *G01N 29/14* (2013.01); *G01N 29/2437* (2013.01); *G01N 29/44* (2013.01)

(58) Field of Classification Search
CPC ........ G01N 29/07; G01N 29/12; G01N 29/14; G01N 29/2437; G01N 29/043; G01N 29/44; G01N 29/46; G01N 2291/044; G01N 2291/106; G01N 2291/0232
See application file for complete search history.

(56) References Cited

U.S. PATENT DOCUMENTS

| | | | |
|---|---|---|---|
| 6,170,334 B1 * | 1/2001 | Paulson | G01H 1/00 73/594 |
| 7,024,315 B2 * | 4/2006 | Giurgiutiu | G01N 29/46 702/33 |
| 2014/0260527 A1 * | 9/2014 | Mazzeo | G01N 29/4472 73/12.05 |

(Continued)

FOREIGN PATENT DOCUMENTS

| | | |
|---|---|---|
| CN | 107850579 A | 3/2018 |
| EP | 3 290 915 A1 | 3/2018 |
| JP | 2004-125721 A | 4/2004 |

*Primary Examiner* — Huy Q Phan
*Assistant Examiner* — Martin Walter Braunlich
(74) *Attorney, Agent, or Firm* — Oblon, McClelland, Maier & Neustadt, L.L.P.

(57) ABSTRACT

According to one embodiment, a structure evaluation system of the embodiments includes a plurality of sensors, a position locator, and an evaluator. The plurality of sensors detect elastic waves. The position locator locates elastic wave sources on the basis of a plurality of elastic waves detected by each of the plurality of sensors. The evaluator evaluates a deterioration state of a structure in accordance with a presence or absence of a sensor and an elastic wave source distribution which shows a position of the elastic wave sources obtained on the basis of a result of locating of the elastic wave sources.

6 Claims, 10 Drawing Sheets

(56) References Cited

U.S. PATENT DOCUMENTS

| | | | | |
|---|---|---|---|---|
| 2016/0139084 A1* | 5/2016 | Usui | ............... | G01N 29/4445 |
| | | | | 73/587 |
| 2017/0212084 A1* | 7/2017 | Komiya | ............... | G01N 29/07 |
| 2017/0328870 A1* | 11/2017 | Garlepp | ............ | H03K 17/9643 |
| 2017/0336365 A1* | 11/2017 | Watabe | ............... | G01M 5/0033 |
| 2017/0363587 A1* | 12/2017 | Takamine | ............ | G01N 29/043 |
| 2018/0074023 A1* | 3/2018 | Iida | ............... | G01N 29/14 |
| 2018/0149622 A1* | 5/2018 | Vieau | ............... | G01N 29/46 |
| 2019/0383696 A1 | 12/2019 | Shiotani et al. | | |

* cited by examiner

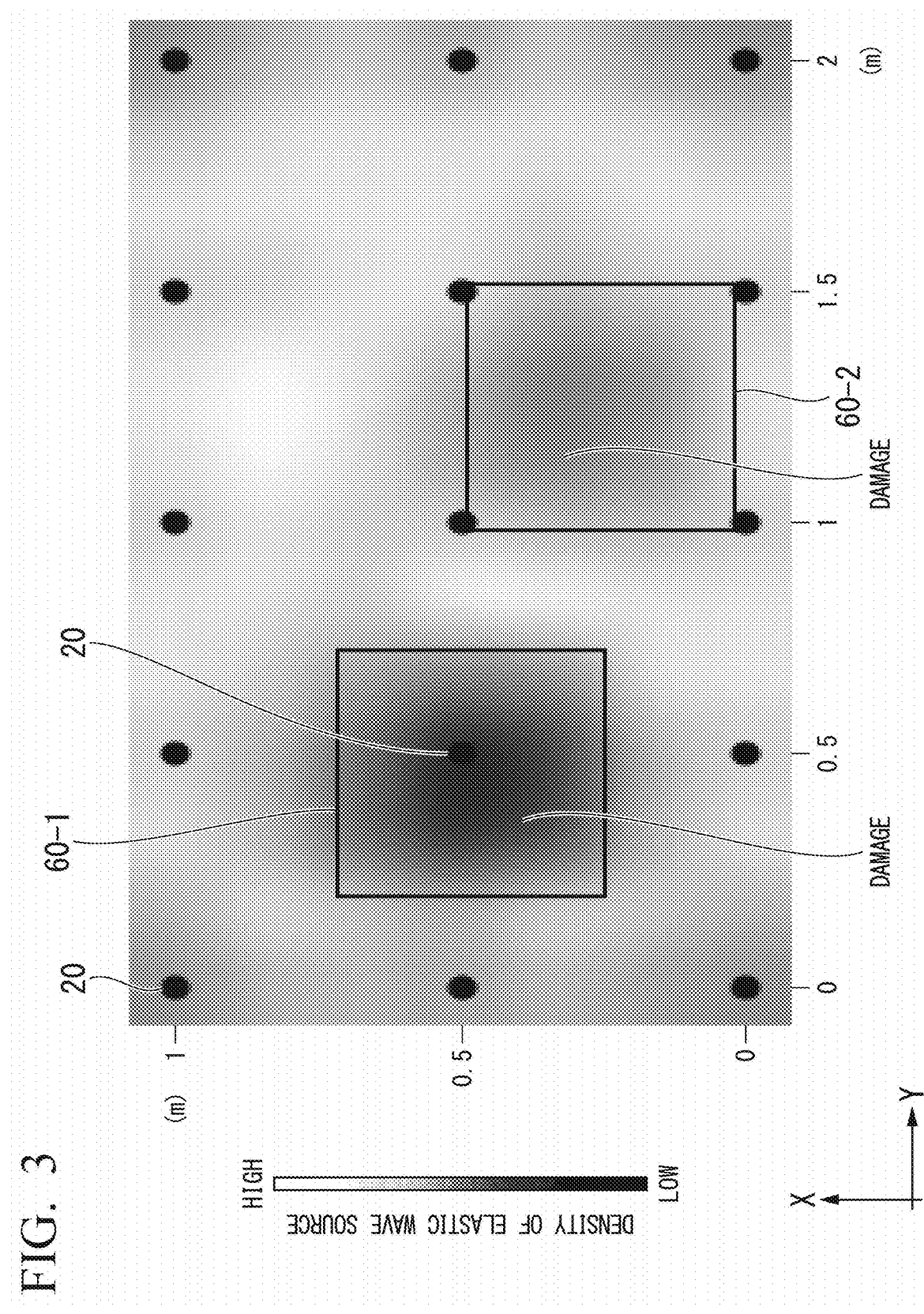

STRUCTURE SOUNDNESS EVALUATION USING ELASTIC WAVES ON DIVIDED AREAS

CROSS-REFERENCE TO RELATED APPLICATION

This is a Continuation Application of International Application PCT/JP2018/034004, filed on Sep. 13, 2018, and the entire contents of all of which are incorporated herein by reference.

FIELD

Embodiments of the present invention relate to a structure evaluation system, a structure evaluation apparatus, and a structure evaluation method.

BACKGROUND

It is possible to detect elastic waves generated from a damaged portion inside a structure by installing a sensor (for example, an acoustic emission (AE) sensor) on a surface of the structure such as a bridge or bedrock. By installing a plurality of sensors on the surface of a structure, a source location of generated elastic wave (hereinafter, referred to as "elastic wave source") can be located based on a difference in arrival times of the elastic waves at the sensors. Moreover, since elastic waves are also generated by applying impacts to the structure from the outside, the position of an elastic wave source can be located. However, if there is damage in a propagation path of elastic waves, transmission of elastic waves is hindered, and thus the accuracy of detection of elastic waves by a sensor is reduced. As a result, a locating accuracy of an elastic wave source also decreases. It is possible to detect damage inside a structure from a disorder of a distribution of elastic wave sources whose positions are located by using features of such a structure.

However, the position of an elastic wave source may be erroneously evaluated depending on a relationship between an area with the damage inside the structure and the installation position of a sensor. As a result, an evaluation accuracy of a deterioration state of a structure may decrease in some cases.

BRIEF DESCRIPTION OF THE DRAWINGS

FIG. 3 is a contour diagram of the elastic wave source distribution in FIG. 2.

DETAILED DESCRIPTION

The present invention provides a structure evaluation system, a structure evaluation apparatus, and a structure evaluation method which can improve an evaluation accuracy of a deterioration state of a structure.

According to one embodiment, a structure evaluation system of embodiments includes a plurality of sensors, a position locator, and an evaluator. The plurality of sensors detect elastic waves. The position locator locates elastic wave sources on the basis of a plurality of elastic waves detected by each of the plurality of sensors. The evaluator evaluates a deterioration state of a structure in accordance with a presence or absence of a sensor and an elastic wave source distribution which shows the position of the generation source obtained on the basis of results of the locating of a generation source of the elastic waves.

Hereinafter, a structure evaluation system, a structure evaluation apparatus, and a structure evaluation method according to embodiments will be described with reference to the drawings.

First Embodiment

Figure 1:
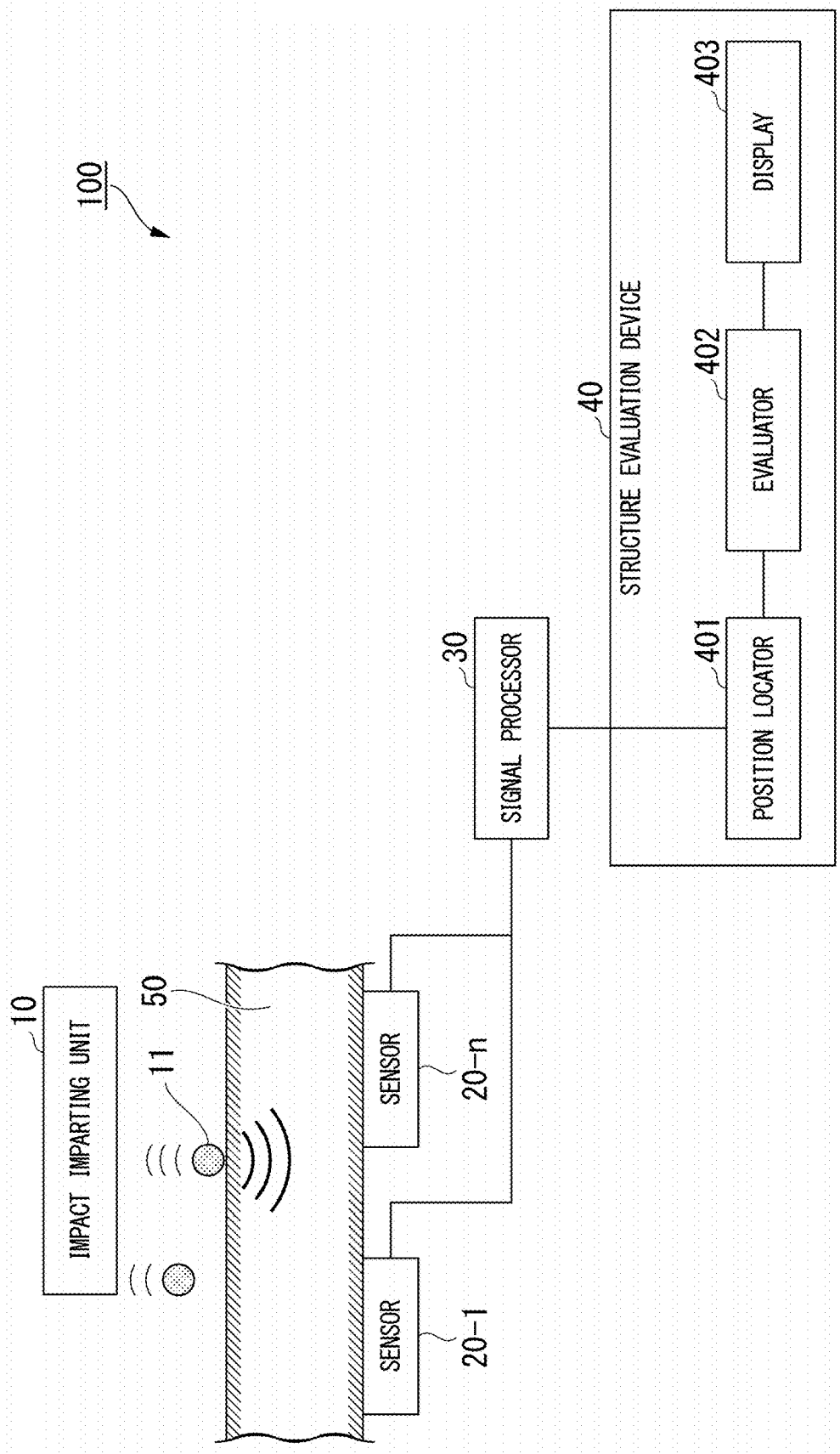
FIG. 1 is a diagram which shows a configuration of a structure evaluation system according to a first embodiment.

FIG. 1 is a diagram which shows a configuration of a structure evaluation system 100 according to a first embodiment.

The structure evaluation system 100 is used for evaluation of soundness of a structure. In the following description, the evaluation means determining a degree of the soundness of a structure, that is, a deterioration state of the structure, on the basis of a certain reference. Note that bridges made of concrete will be described as an example of the structure in the following description, but the structure is not necessarily limited to bridges. For example, the structure may be any structure that generates elastic waves due to generation or development of a crack, or external impacts (for example, rain, artificial rain, and the like). Note that bridges are not limited to structures built on rivers and valleys and also include various structures provided above the ground (for example, viaducts on expressways).

In addition, damage that affects an evaluation of the deterioration state of a structure includes, for example, damage inside a structure which interferes with transmission of elastic waves such as cracks, void, disintegration, and, scaling. Here, cracks include vertical cracks, horizontal cracks, diagonal cracks, and the like. Vertical cracks are cracks that are generated in a direction perpendicular to the surface of a structure on which sensors are installed. Horizontal cracks are cracks that are generated in a horizontal direction with respect to the surface of a structure on which sensors are installed. Diagonal cracks are cracks that are generated in directions other than the horizontal and vertical directions with respect to the surface of a structure on which sensors are installed. Disintegration and scaling having a state of mixture of sands and gravels is caused by deterioration at boundary between asphalt and a concrete slab.

The structure evaluation system 100 includes an impact imparting unit 10, a plurality of sensors 20-1 to 20-n (n is an integer equal to or more than 2), a signal processor 30, and a structure evaluation apparatus 40. The signal processor 30 and the structure evaluation apparatus 40 are connected to be able to communicate in a wired manner or wirelessly. In the following description, if there is no distinction between the sensors 20-1 to 20-n, the sensors will be referred to as a sensor 20.

The impact imparting unit 10 generates elastic waves inside the structure by giving an impacts 11 to a structure 50. The impact imparting unit 10 is, for example, a device provided in a vehicle traveling on the structure 50. The impact imparting unit 10 applies a large number of impacts 11 to a road surface of the structure 50 in a uniform distribution. The impacts 11 may be applied to a wide range of the road surface of the structure 50. For example, the impacts 11 are applied by spraying water droplets, ice particles, or solids, hammering with a hammer, heating with laser, and the like. When the impact imparting unit 10 sprays water droplets as the impacts 11, it is desirable that a size and timing of a water droplet hitting the road surface can be controlled by adjusting a nozzle and controlling a discharge timing. It is desirable that a strength and timing of the impacts 11 can be controlled such that they have desired values even in consecutive hits with a hammer.

The sensor 20 is installed in the structure 50. For example, the sensor 20 is installed on a surface opposite to the surface onto which the impacts 11 is applied by the impact imparting unit 10. The sensor 20 has a piezoelectric element, detects elastic waves generated from the inside the structure 50, and converts the detected elastic waves into an AE source signal that is a voltage signal. The sensor 20 performs processing such as amplification and frequency limitation on the AE source signal, and outputs the processed signal to the signal processor 30. Note that an acceleration sensor may be used instead of the sensor 20. In this case, the acceleration sensor performs the same processing as that of the sensor 20 and outputs the processed signal to the signal processor 30. A thickness of the structure 50 is, for example, 15 cm or more.

The signal processor 30 inputs the AE source signal processed by the sensor 20. The signal processor 30 performs signal processing such as required noise removal and parameter extraction on the input AE source signal, and extracts an AE feature amount including information on elastic waves from the input AE source signal. The information on elastic waves is, for example, information such as an amplitude, energy, a rise time, a duration, a frequency, and the number of zero cross counts. The signal processor 30 outputs information based on the extracted AE feature amount to the structure evaluation apparatus 40 as an AE signal. The AE signal output by the signal processor 30 includes information such as a sensor ID, an AE detection time, an AE source signal amplitude, an energy, a rise time, and a frequency. The AE detection time represents a time at which elastic waves are detected by the sensor 20.

The signal processor 30 performs, for example, signal processing such as noise removal and parameter extraction. The information on elastic waves is, for example, information on the amplitude, the energy, the rise time, the duration, the frequency, and the number of zero cross counts. The AE signal output by the signal processor 30 includes information such as a sensor ID, an AE detection time, an AE source signal amplitude, an energy, a rise time, and a frequency.

Here, the amplitude of an AE source signal is, for example, a value of the maximum amplitude among elastic waves. The energy is, for example, a value obtained by time-integrating squares of the amplitude at each time point. Note that a definition of energy is not limited to the example described above, and may be approximated using, for example, an envelope waveform. The rise time is, for example, a time required for elastic waves to rise from a zero value to a value exceeding a predetermined value set in advance. The duration is, for example, a time from a start of a rise of elastic waves until the amplitude becomes smaller than a value set in advance. The frequency is a frequency of elastic waves. The number of zero cross counts is, for example, the number of times elastic waves cross a reference line passing through the zero value.

The structure evaluation apparatus 40 includes a central processing unit (CPU), a memory, an auxiliary storage device, and the like connected by a bus, and executes an evaluation program. The structure evaluation apparatus 40 functions as a device including a position locator 401, an evaluator 402, and a display 403 by executing the evaluation program. Note that all or some of functions of the structure evaluation apparatus 40 may be realized using hardware such as an application specific integrated circuit (ASIC), a programmable logic device (PLD), and a field programmable gate array (FPGA). In addition, the evaluation program may be recorded on a computer-readable recording medium. The computer-readable recording medium is, for example, a flexible disk, a magneto-optical disc, a ROM, a portable medium such as a CD-ROM, or a storage device such as a hard disk embedded in a computer system. In addition, the evaluation program may be transmitted and received via a telecommunication line.

The position locator 401 inputs the AE signal output from the signal processor 30. In addition, the position locator 401 holds information on an installation position of the sensor 20 installed in the structure 50 (hereinafter, referred to as "sensor position information") in association with the sensor ID in advance. The information on an installation position is, for example, a latitude and longitude, or a distance in a horizontal direction and a vertical direction from a reference position of the structure 50.

The position locator 401 locates a position of an elastic wave sources on the basis of information such as a sensor ID and an AB detection time included in the input AE signal, and the sensor position information held in advance. Specifically, the position locator 401 locates the position of elastic wave sources on the basis of a difference of an arrival time of elastic waves at the plurality of sensors 20, that is, the AE detection time. The position locator 401 generates an elastic wave source distribution in an evaluation target area in the structure 50 using information on the positions of a plurality of elastic wave sources obtained during a certain period of time. The evaluation target area in the structure 50 is an area surrounded by the sensor 20. The elastic wave source distribution is a distribution indicating the located positions of the elastic wave sources. The position locator 401 outputs the generated elastic wave source distribution to the evaluator 402.

The evaluator 402 inputs the elastic wave source distribution output from the position locator 401. The evaluator 402 evaluates a deterioration state of the structure 50 on the basis of the elastic wave source distribution and the installation position of the sensor 20. Specifically, the evaluator 402 acquires a feature amount of elastic waves in the elastic wave source distribution on the basis of the elastic wave source distribution, and evaluates the deterioration state of the structure 50 using the acquired feature amount and the installation position of the sensor 20. The feature amount of elastic waves in the elastic wave source distribution is, for example, a density of an elastic wave source, a volume of elastic waves, and an amplitude of elastic waves.

As specific processing, first, the evaluator 402 divides a range in which the elastic wave source distribution extends into areas suitable for evaluation (hereinafter, referred to as "evaluation areas"). The evaluation areas are set in advance. For example, the evaluation areas are set to be equal to or smaller than a size of damage to be detected and to include one or more positions to which the impacts 11 is applied. It is possible to evaluate a presence or absence of a smaller damage when a space between the areas is narrower. In addition, as a position to which more impacts 11 are applied is included in one area, a difference in density is significant, and an evaluation accuracy is further improved.

Next, the evaluator 402 calculates the density of an elastic wave source for each evaluation area. Then, the evaluator 402 evaluates the deterioration state of the structure 50 by comparing the calculated density of an elastic wave source for each evaluation area with at least one of a first threshold and a second threshold determined in advance. The second threshold is larger than the first threshold. The evaluator 402 causes the display 403 to display a result of the evaluation.

The display 403 is an image display device such as a liquid crystal display or an organic electro luminescence (EL) display. The display 403 displays the result of the evaluation according to control of the evaluator 402. The display 403 may be an interface for connecting an image display device to the structure evaluation apparatus 40. In this case, the display 403 generates a video signal for displaying the result of the evaluation and outputs the video signal to the image display device connected thereto.

Next, a reason for setting the first threshold and the second threshold as described above will be described.

Figure 2:
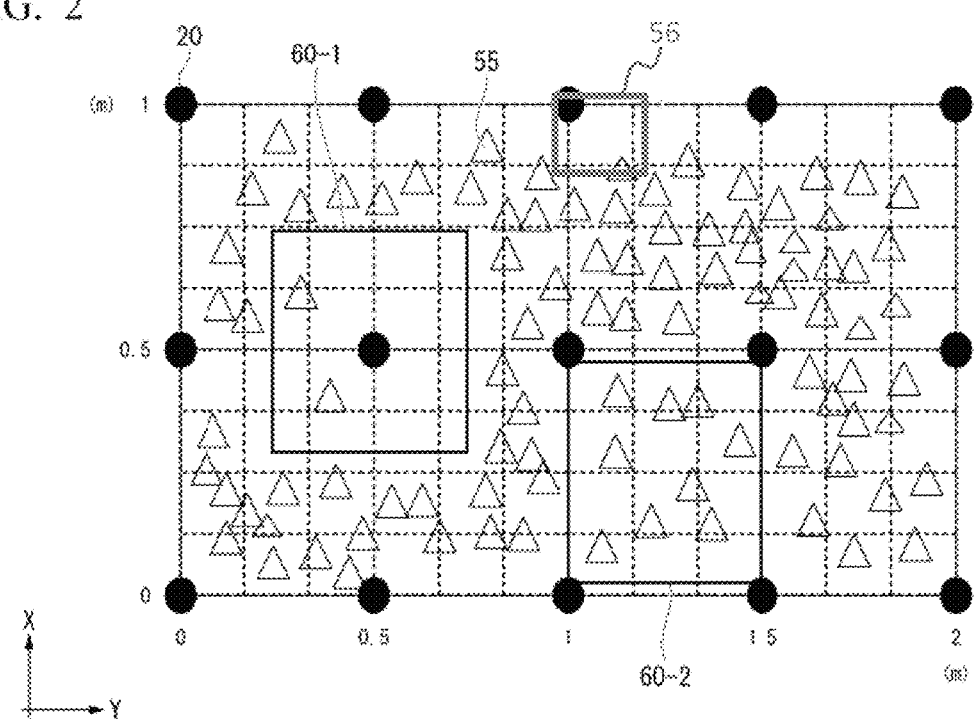
FIG. 2 is a diagram which shows an elastic wave source distribution generated by a position locator locating a position of an elastic wave source when uniform impacts are applied to the structure.

FIG. 2 is a diagram which shows the elastic wave source distribution generated by the position locator 401 performing the locating of an elastic wave sources when uniform impacts 11 are applied to the structure 50. In addition, FIG. 3 is a contour diagram of the elastic wave source distribution in FIG. 2. In FIGS. 2 and 3, the vertical and horizontal axes represent a length (m) of an evaluation target area. Positions of black circles in FIGS. 2 and 3 indicate the installation position of the sensor 20. FIGS. 2 and 3 show a case in which 15 sensors 20 are installed. A position of a triangle 55 in FIG. 2 shows the position of elastic wave sources.

It is assumed that there is a damage in areas 60-1 and 60-2 shown in FIG. 2. Although the areas 60-1 and 60-2 have damage, it is evaluated that the number of elastic wave sources is relatively less in the area 60-1 than in the area 60-2 in the example shown in FIG. 2. A difference between these two areas is that the sensor 20 is installed immediately below the damage in the area 60-1 and the sensor 20 is not installed immediately below the damage in the area 60-2. Note that each grid-shaped area 56 indicated by dotted lines is an evaluation area in FIG. 2.

With reference to FIG. 3, while the density of the elastic wave source due to the damage is significantly reduced in the area 60-1, the density of the elastic wave source due to the damage is relatively large in the area 60-2. Therefore, when the evaluator 402 has evaluated the areas 60-1 and 60-2 using the same one threshold, if the threshold is too low, the density of the elastic wave source of a damaged portion in the area 60-2 does not fall below the threshold and it is not evaluated as damage. On the other hand, if the threshold is too large, when the density of elastic waves has a slight difference due to a variation of an execution method at the time of measurement such as an impact application condition, a measurement condition, or the like in the area 60-1, the damaged portion is erroneously evaluated as a soundness area.

A reason for occurrence of the phenomenon described above will be described using FIG. 4.

Figure 4A:
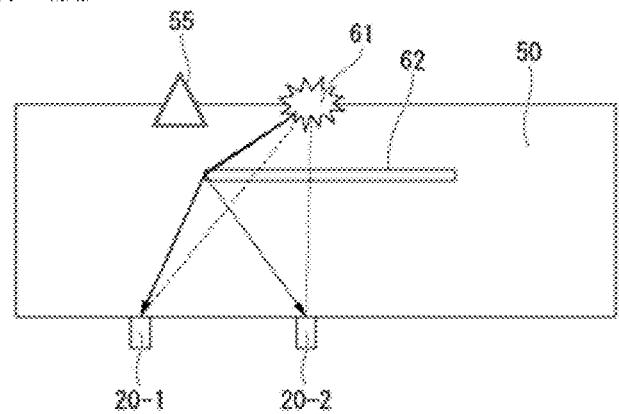
FIG. 4A is a cross-sectional view of a structure when a sensor is installed immediately under damage.
Figure 4B:
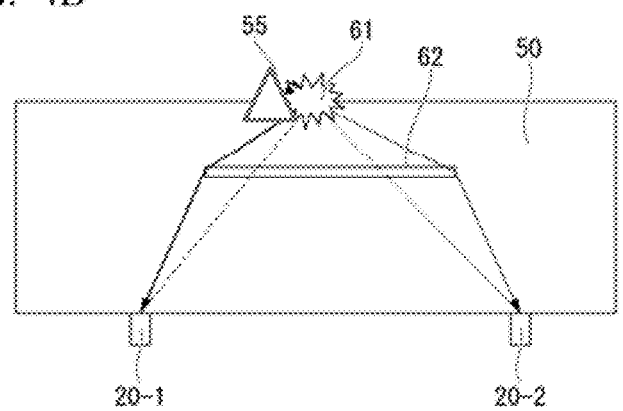
FIG. 4B is a cross-sectional view of a structure when a sensor is not installed immediately under damage.

FIG. 4A is a cross-sectional view of the structure 50 when the sensor 20 is installed immediately below damage 62. FIG. 4B is a cross-sectional view of the structure 50 when the sensor 20 is not installed immediately below the damage 62. In FIGS. 4A and 4B, damage in the horizontal direction is shown as an example of the damage 62. However, the damage in the present embodiment is a crack, a void, disintegration, and, scaling, or the like as described above. In FIGS. 4A and 4B, a reference numeral 61 indicates an application position of the impacts 11. Since a transmission of elastic waves generated on an upper surface of the structure 50 due to the impacts 11 applied at an application position 61 is hindered by the damage 62, the elastic waves hardly transmit the damage 62. Therefore, the elastic waves diffracted by the damage 62 reach the sensor 20.

In a case of FIG. 4A, since a diffraction angle of elastic waves is large, an attenuation is large, and the elastic waves hardly reach the sensor 20 immediately below the damage 62. In addition, even if the elastic waves reach the sensor 20, since a difference in arrival times of elastic waves at each of the sensors 20-1 and 20-2 shown in FIG. 4A is equal to a time difference from the end of the damage 62, an elastic wave source 55 is located at the end of the damage 62. As described above, when the sensor 20 is installed immediately below the damage 62, the density of an elastic wave source in an area in which the damage 62 occurs significantly decreases.

On the other hand, in the case of FIG. 4B, the diffraction angle is relatively small and many elastic waves are diffracted and reach the sensor 20. In addition, a difference in arrival time of elastic waves at each of the sensors 20-1 and 20-2 shown in FIG. 4B may not be much different from a case in which there is no damage 62. For this reason, the number of elastic wave sources located at a position immediately above the damage 62 increases. As described above, when the sensor 20 is not installed immediately below the damage 62, a decrease in the density of an elastic wave source in the area in which a damage occurs is smaller than when the sensor 20 is installed immediately below the damage 62.

As described above, a decrease degree of the density of an elastic wave source varies depending on whether or not the sensor 20 is installed below the area in which the damage 62 occurs. Therefore, the structure evaluation apparatus 40 in the present embodiment evaluates the deterioration state of the structure 50 on the basis of the elastic wave source distribution and the installation position of the sensor 20.

Figure 5:
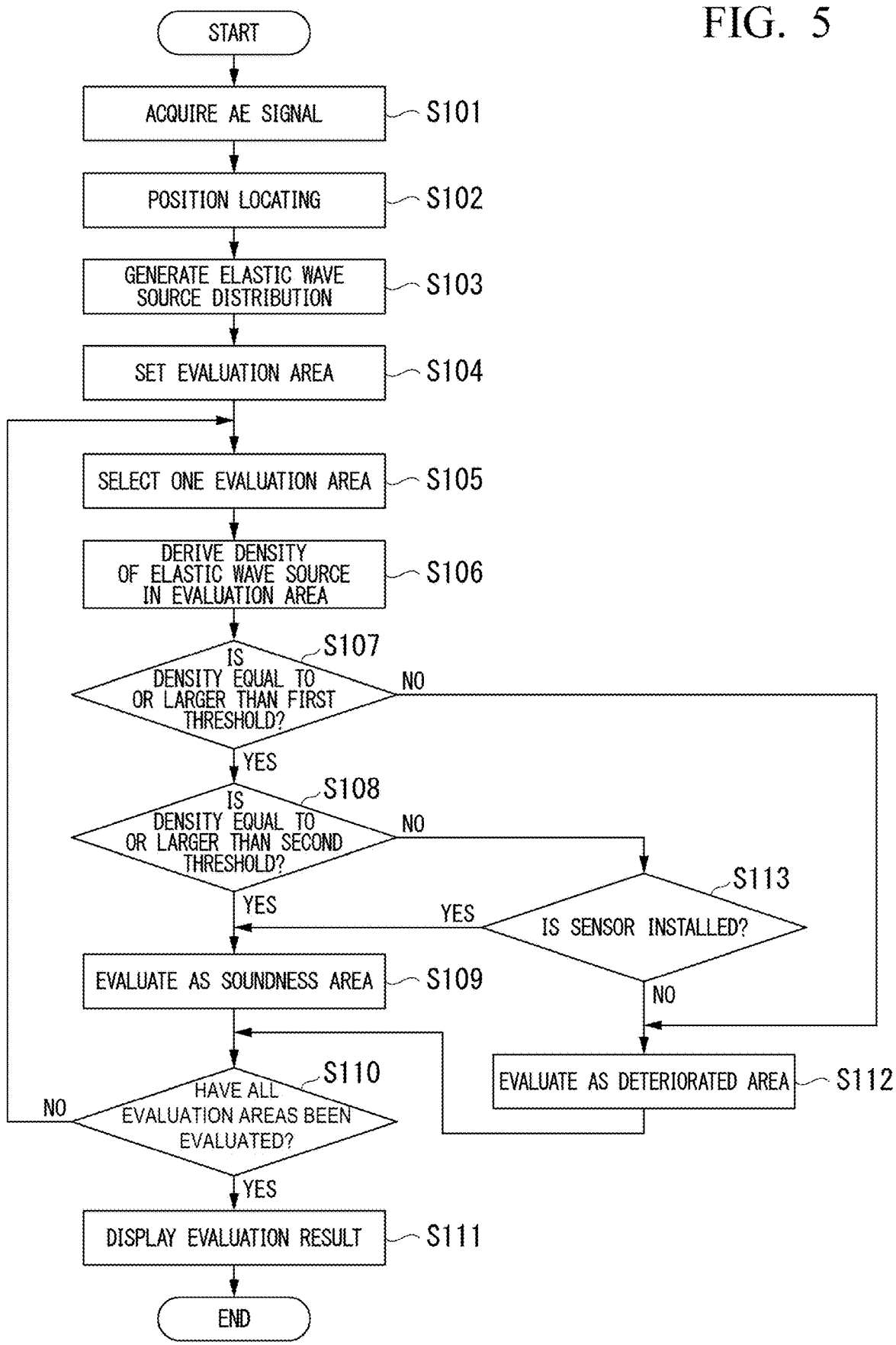
FIG. 5 is a flowchart which shows a flow of deterioration state evaluation processing performed by a structure evaluation apparatus according to the first embodiment.

FIG. 5 is a flowchart which shows a flow of deterioration state evaluation processing performed by the structure evaluation apparatus 40 according to the first embodiment.

The position locator 401 acquires an AE signal output from the signal processor 30 (step S101). The position locator 401 locates elastic wave sources on the basis of information such as a sensor ID, an AE detection time and the like included in the acquired AE signal, and sensor position information held in advance (step S102). Thereafter, the position locator 401 generates an elastic wave source distribution using a result of locating the elastic wave sources (step S103).

The position locator 401 outputs the generated elastic wave source distribution and the information on the installation position of the sensor 20 to the evaluator 402. The evaluator 402 acquires the elastic wave source distribution and the information on the installation position of the sensor 20 output from the position locator 401. The evaluator 402 sets an evaluation area for the acquired elastic wave source distribution (step S104). For example, the evaluator 402 sets an evaluation area (an area 56 shown in FIG. 2) for the elastic wave source distribution as shown in FIG. 2.

The evaluator 402 selects one evaluation area among a plurality of set evaluation areas (step S105). At this time, the evaluator 402 selects an evaluation area on which comparison with the threshold is not performed. Next, the evaluator 402 derives the density of an elastic wave source in the selected evaluation area (step S106). The evaluator 402 determines whether or not the derived density of an elastic wave source (a first feature amount) is equal to or larger than the first threshold (step S107). When the density of an elastic wave source is equal to or larger than the first threshold (YES in step S107), the evaluator 402 determines whether or not the derived density of an elastic wave source (the first feature amount) is equal to or larger than the second threshold (step S108).

When the density of an elastic wave source is equal to or larger than the second threshold (YES in step S108), the evaluator 402 evaluates the selected evaluation area as a soundness area (step S109). The evaluator 402 determines whether or not all evaluation areas have been evaluated (step S110). When all the evaluation areas have been evaluated (YES in step S110), the evaluator 402 outputs results of the evaluation to the display 403. The display 403 displays the result of evaluation under control of the evaluator 402 (step S111). Specifically, the display 403 superimposes and displays the result of evaluation (soundness or deteriorated) for each evaluation area of the elastic wave source distribution.

In the processing of step S110, when all the evaluation areas have not been evaluated (NO in step S110), the evaluator 402 executes processing of step S105 and thereafter.

In addition, in the processing of step S107, when the density of an elastic wave source is less than the first threshold (NO in step S107), the evaluator 402 evaluates the selected evaluation area as a deteriorated area (step S112).

In addition, in the processing of step S108, when the density of an elastic wave source is less than the second threshold (NO in step S108), the evaluator 402 determines whether or not the sensor 20 is installed in the selected evaluation area using the information on the installation position of the sensor 20 (step S113).

When the sensor 20 is installed in the selected evaluation area (YES in step S113), the evaluator 402 evaluates the selected evaluation area as a soundness area (step S109).

On the other hand, when the sensor 20 is not installed in the selected evaluation area (NO in step S113), the evaluator 402 evaluates the selected evaluation area as a deteriorated area (step S112).

According to the structure evaluation system 100 configured in this manner, the structure evaluation apparatus 40 evaluates the deterioration state in accordance with the density of an elastic wave source in an evaluation area and a presence or absence of the sensor 20 in the evaluation area, and thereby it is possible to improve the evaluation accuracy of the deterioration state of a structure. Specifically, the structure evaluation apparatus 40 determines whether or not the sensor 20 is installed in the evaluation area when the density of an elastic wave source in the evaluation area is less than the second threshold. The density of an elastic wave source tends to decrease near a place in which the sensor 20 is installed. Therefore, the structure evaluation apparatus 40 evaluates the evaluation area as a soundness area when the sensor 20 is installed in the evaluation area even if the density of an elastic wave source is less than the second threshold and conditions for evaluating an area as a deteriorated area are satisfied. Then, when the density of an elastic wave source is less than the second threshold and the sensor 20 is not installed in the evaluation area, the structure evaluation apparatus 40 evaluates the evaluation area as a deteriorated area. With such a configuration, it is possible to curb erroneous evaluation due to the installation position of the sensor 20. For this reason, the evaluation accuracy of the deterioration state of a structure can be improved.

Moreover, the structure evaluation apparatus 40 evaluates the deterioration state using two thresholds such as a first threshold and a second threshold. For example, when a damage is in the entire structure 50, the structure evaluation apparatus 40 determines an entire evaluation area as a deteriorated area by comparing the first threshold with the density in the evaluation area. As a result, the structure evaluation apparatus 40 can determine that the evaluation area is a deteriorated area before comparing the second threshold with the density of the evaluation area. For this reason, the evaluation accuracy can be further improved compared to a case of evaluating the deterioration state of a structure using only the second threshold.

Hereinafter, a modification of the structure evaluation system 100 according to the first embodiment will be described.

A configuration in which the structure evaluation apparatus 40 compares the first threshold and the second threshold with the density of an elastic wave source which is one of features amounts of elastic waves in the elastic wave source distribution is shown in the present embodiment, but processing of the structure evaluation apparatus 40 is not necessarily limited thereto. For example, the structure evaluation apparatus 40 may be configured to compare the amplitude of elastic waves which is one of feature amounts of elastic waves in the elastic wave source distribution (the second feature amount) with the first threshold for the amplitude of elastic waves, and compare the second threshold with the density of an elastic wave source (the first feature amount). When the amplitude of elastic waves is used, the evaluator 402 derives an average value of the amplitudes of elastic waves for each evaluation area, and compares the derived average value of the amplitudes with the first threshold.

The structure evaluation apparatus 40 may be configured to evaluate the deterioration state of the structure 50 on the basis of one threshold and the installation position of the sensor 20. With such a configuration, the structure evaluation apparatus 40 executes the processing of step S108 after the processing of step S106 without executing processing of step S107.

Second Embodiment

In a second embodiment, a structure evaluation system evaluates the deterioration state of a structure in accordance with whether or not an evaluation area is included in a predetermined range centering on each sensor.

Figure 6:
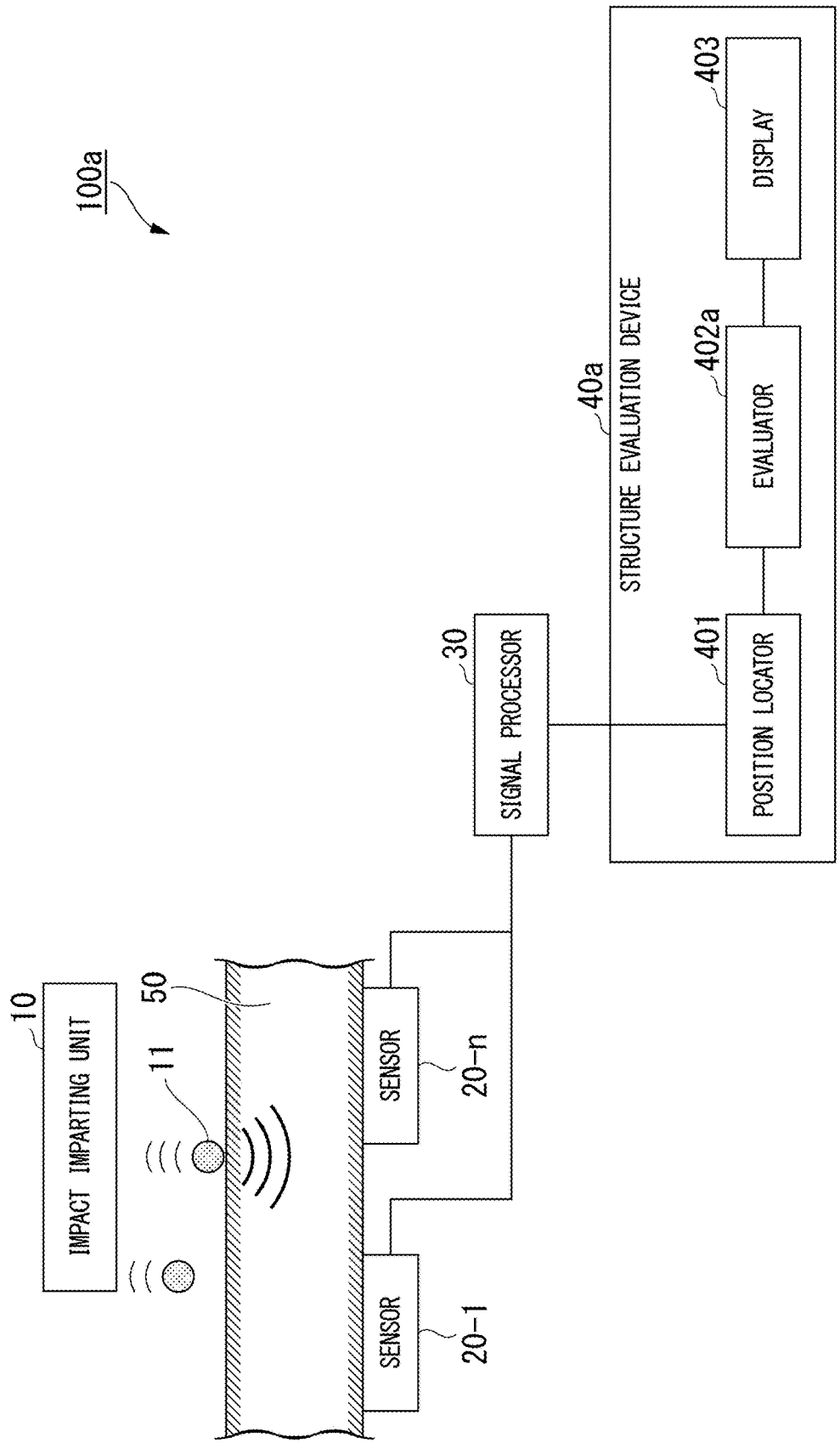
FIG. 6 is a diagram which shows a configuration of a structure evaluation system according to a second embodiment.

FIG. 6 is a diagram which shows a configuration of a structure evaluation system 100a according to the second embodiment.

The structure evaluation system 100a includes an impact imparting unit 10, a plurality of sensors 20-1 to 20-n, a signal processor 30, and a structure evaluation apparatus 40a. The structure evaluation system 100a is different from the structure evaluation system 100 in configuration in that it includes a structure evaluation apparatus 40a instead of the structure evaluation apparatus 40. In the following description, only the structure evaluation apparatus 40a will be described.

The structure evaluation apparatus 40a includes a CPU, a memory, an auxiliary storage device, and the like which are connected by a bus, and executes an evaluation program. The structure evaluation apparatus 40a functions as a device including the position locator 401, an evaluator 402a, and the display 403 by executing the evaluation program. Note that all or some of functions of the structure evaluation apparatus 40a may be realized using hardware such as an ASIC, a PLD, or FPGA. In addition, the evaluation program may be recorded on a computer-readable recording medium. The computer-readable recording medium is, for example, a flexible disk, a magneto-optical disc, a ROM, a portable medium such as a CD-ROM, and a storage device such as a hard disk embedded in a computer system. The evaluation program may be transmitted or received via a telecommunication line.

The structure evaluation apparatus 40a is different from the structure evaluation apparatus 40 in configuration in that it includes the evaluator 402a instead of the evaluator 402. The other constituents of the structure evaluation apparatus 40a are the same as those of the structure evaluation apparatus 40. For this reason, only differences between the evaluator 402a and the evaluator 402 will be described.

The evaluator 402a evaluates the deterioration state of the structure 50 in accordance with whether or not the evaluation area is included in a predetermined range centering about each sensor 20 when the density of an elastic wave source is less than the second threshold. The predetermined range centering about the sensor 20 is a range determined with the sensor 20 as a center, and may be, for example, a range with a radius D centering about the sensor 20 or may be a rectangular range having different distances in an X direction and a Y direction, which centers about the sensor 20. The distance D is set to be sufficiently small with respect to a sensor interval. The evaluator 402a outputs a result of the evaluation to the display 403.

Figure 7:
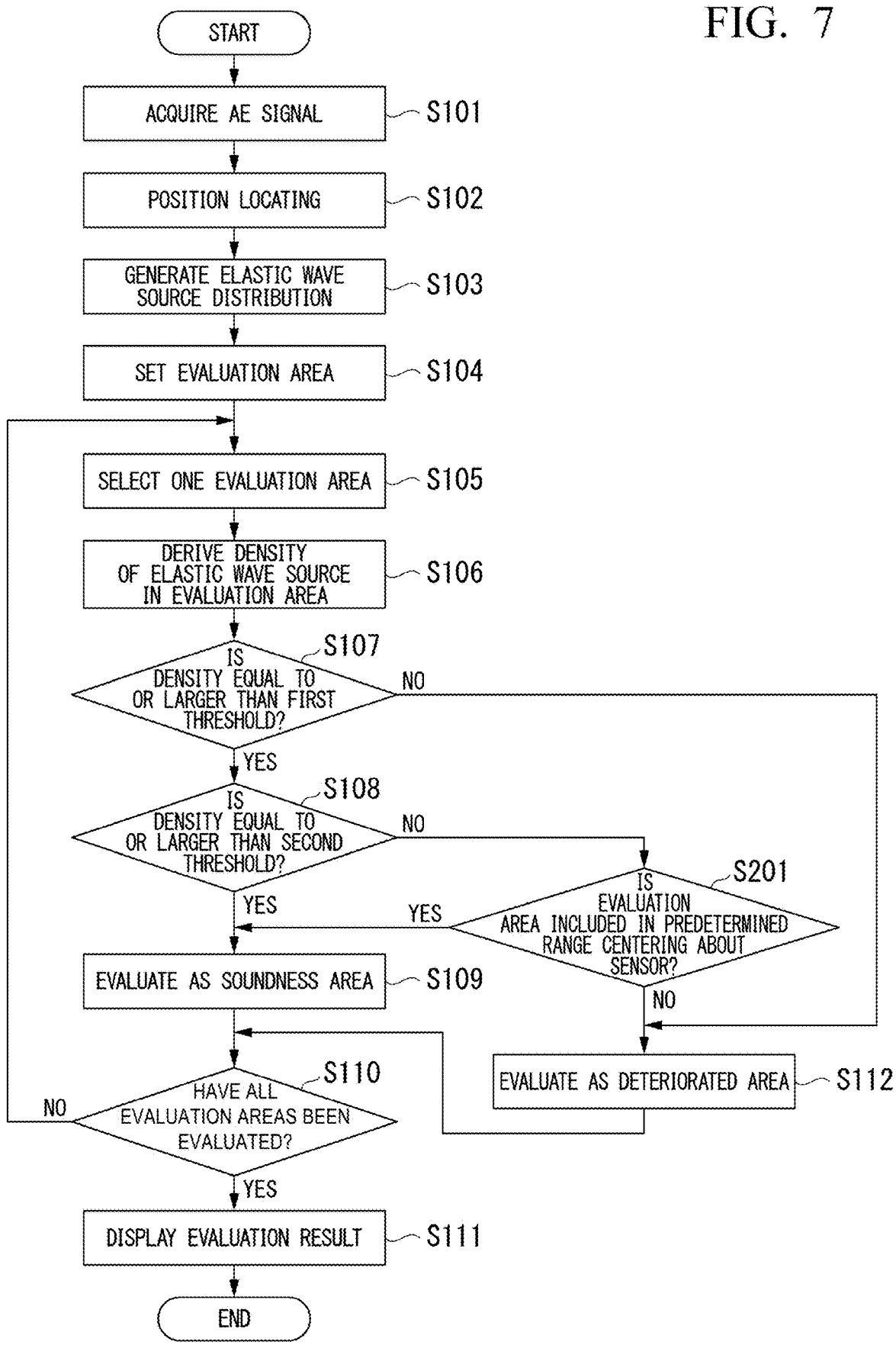
FIG. 7 is a flowchart which shows a flow of deterioration state evaluation processing performed by the structure evaluation apparatus according to the second embodiment.

FIG. 7 is a flowchart which shows a flow of the deterioration state evaluation processing performed by the structure evaluation apparatus 40a according to the second embodiment. Note the same processing as in FIG. 5 will be denoted by the same reference numerals in FIG. 7, and description thereof will be omitted.

In the processing of step S108, when the density of an elastic wave source is less than the second threshold (NO in step S108), the evaluator 402a determines whether or not an evaluation area is included in the predetermined range centering about each sensor 20 (step S201). The evaluator 402a determines that the evaluation area is included in the predetermined range centering about each sensor 20 when some or all of the evaluation area is included in the predetermined range centering about each sensor 20. The evaluator 402a determines that the evaluation area is not included in the predetermined range centering about each sensor 20 when all of the evaluation area is not included in the predetermined range centering about the evaluation area.

When the evaluation area is included in the predetermined range centering about each sensor 20 (YES in step S201), the evaluator 402a evaluates the selected evaluation area as a soundness area (step S109).

On the other hand, when the evaluation area is not included in the predetermined range centering about each sensor 20 (NO in step S201), the evaluator 402a evaluates the selected evaluation area as a deteriorated area (step S112).

The structure evaluation system 100a configured as described above determines whether or not the evaluation area is included in the predetermined range centering about the sensor 20 when the density of an elastic wave source in the evaluation area is less than the second threshold. As described above, the density of an elastic wave source tends to decrease near the place in which the sensor 20 is installed. Here, even if the density of an elastic wave source is less than the second threshold and conditions for evaluating the evaluation area as a deteriorated area are satisfied, when the evaluation area is included in the predetermined range centering about the sensor 20, the structure evaluation apparatus 40a evaluates the evaluation area as a soundness area. Then, when the density of an elastic wave source is less than the second threshold and the evaluation area is not included in the predetermined range centering about the sensor 20, the structure evaluation apparatus 40a evaluates the evaluation area as a deteriorated area. With such a configuration, it is possible to curb an erroneous evaluation due to the installation position of the sensor 20. For this reason, the evaluation accuracy of the deterioration state of a structure can be improved.

The structure evaluation system 100a according to the second embodiment may be modified in a similar manner to the structure evaluation system 100.

Third Embodiment

In a third embodiment, a structure evaluation system evaluates a deterioration state of a structure by correcting an elastic wave source density distribution.

Figure 8:
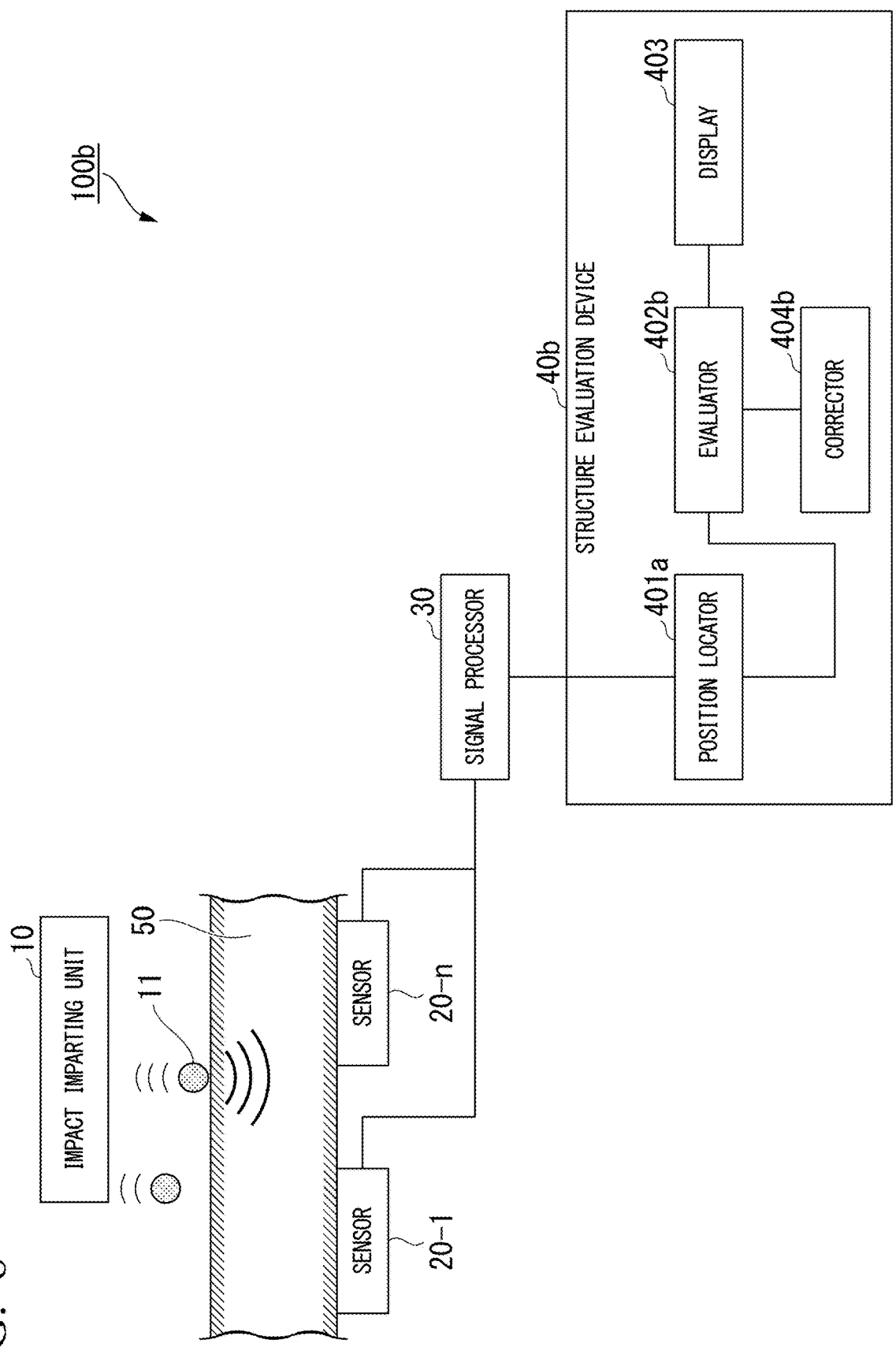
FIG. 8 is a diagram which shows a configuration of a structure evaluation system according to a third embodiment.

FIG. 8 is a diagram which shows a configuration of a structure evaluation system 100b according to the third embodiment.

The structure evaluation system 100b includes an impact imparting unit 10, a plurality of sensors 20-1 to 20-n, a signal processor 30, and a structure evaluation apparatus 40b. The structure evaluation system 100b is different from the structure evaluation system 100 in configuration in that it includes the structure evaluation apparatus 40b instead of the structure evaluation apparatus 40. In the following description, only the structure evaluation apparatus 40b will be described.

The structure evaluation apparatus 40b includes a CPU, a memory, an auxiliary storage device, and the like connected by a bus, and executes an evaluation program. The structure evaluation apparatus 40b functions as a device including the position locator 401, the evaluator 402b, the display 403, and a corrector 404b by executing the evaluation program. Note that all or some of functions of the structure evaluation apparatus 40b may be realized using hardware such as an ASIC, a PLD, and an FPGA. In addition, the evaluation program may also be recorded in a computer-readable recording medium. The computer-readable recording medium is, for example, a flexible disk, a magneto-optical disc, a ROM, a portable medium such as a CD-ROM, and a storage device such as a hard disk embedded in a computer system. The evaluation program may be transmitted or received via a telecommunication line.

The structure evaluation apparatus 40*b* is different from the structure evaluation apparatus 40 in configuration in that it includes an evaluator 402*b* instead of the evaluator 402 and newly includes the corrector 404*b*. The structure evaluation apparatus 40*b* is the same as the structure evaluation apparatus 40 in other configurations. For this reason, only the evaluator 402*b* and the corrector 404*b* will be described.

The evaluator 402*b* generates an elastic wave source density distribution using the derived density of an elastic wave source for each evaluation area and the elastic wave source distribution. The elastic wave source density distribution is a distribution representing the density of an elastic wave source. For example, the elastic wave source density distribution is represented by a contour diagram as shown in FIG. 3. The evaluator 402*b* evaluates the deterioration state of a structure on the basis of a corrected elastic wave source density distribution corrected by the corrector 404*b*. The evaluator 402*b* outputs a result of the evaluation to the display 403.

The corrector 404*b* corrects the elastic wave source density distribution by performing different processing on the elastic wave source density distribution according to a distance from the position of the sensor 20. Specific processing performed by the corrector 404*b* will be described using FIG. 9.

Figure 9:
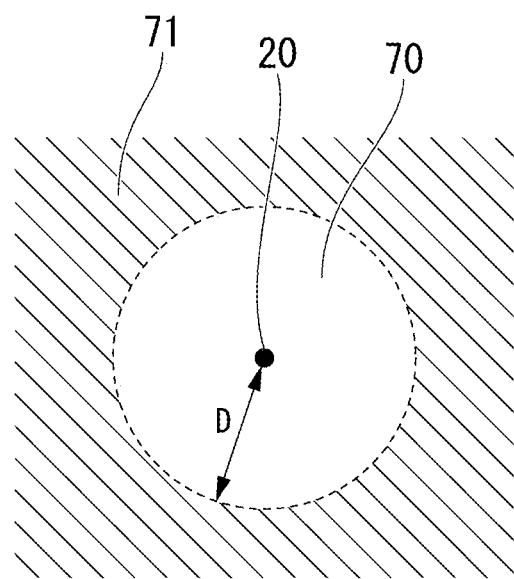
FIG. 9 is a diagram for describing processing of a corrector included in a structure evaluation apparatus according to the third embodiment.

FIG. 9 is a diagram for describing processing performed by the corrector 404*b*.

As shown in FIG. 9, the corrector 404*b* does not perform correction on an area 70 within a distance D from the installation position of the sensor 20 in the areas of the elastic wave source density distribution. In addition, the corrector 404*b* performs the following correction on an area 71 that exceeds the distance D from the installation position of the sensor 20 in the areas of the elastic wave source density distribution, that is, which is away from the installation position of the sensor 20 by the distance D or more in the areas of the elastic wave source density distribution. For example, the corrector 404*b* calculates $p'=M-k(M-p)$ with respect to an elastic wave source density p on the basis of a value of the elastic wave source density obtained in the elastic wave source density distribution and a correction coefficient k, and derives the corrected elastic wave source density p'. Here, M is an average elastic wave source density in a soundness area. In addition, the correction coefficient k and the distance D do not need to be constants, and a coefficient which continuously changes in accordance with measurement conditions such as the sensor interval may also be used.

Figure 10:
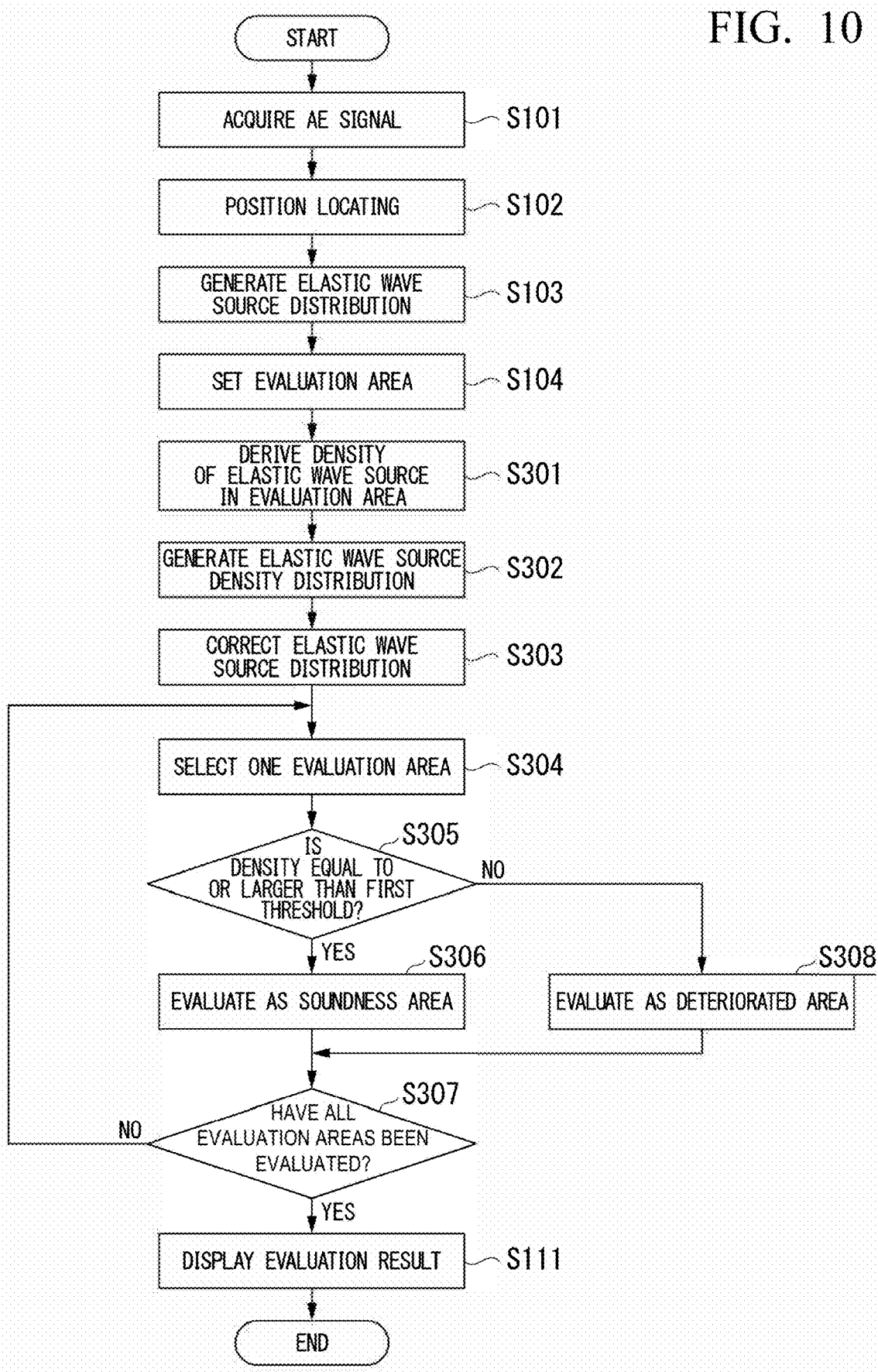
FIG. 10 is a flowchart which shows a flow of deterioration state evaluation processing performed by the structure evaluation apparatus according to the third embodiment.

FIG. 10 is a flowchart which shows a flow of deterioration state evaluation processing performed by the structure evaluation apparatus 40*b* according to the third embodiment. Note that the same processing as in FIG. 5 will be denoted by the same reference numerals in FIG. 10, and thus description thereof will be omitted.

After the processing of step S104, the evaluator 402*b* derives the density of an elastic wave source for each evaluation area (step S301). The evaluator 402*b* generates an elastic wave source density distribution using the derived density of an elastic wave source for each evaluation area and the elastic wave source distribution (step S302). The evaluator 402*b* outputs the generated elastic wave source density distribution to the corrector 404*b*.

The corrector 404*b* generates a corrected elastic wave source density distribution by correcting the generated elastic wave source density distribution according to the installation position of the sensor 20 (step S303). The corrector 404*b* outputs the corrected elastic wave source density distribution to the evaluator 402*b*. The evaluator 402*b* selects one of evaluation areas in the corrected elastic wave source density distribution output from the corrector 404*b* (step S304). The evaluation area in the corrected elastic wave source density distribution is the same as the evaluation area set in the elastic wave source distribution in the processing of step S104 by the evaluator 402*b*.

The evaluator 402*b* determines whether or not the density of an elastic wave source in the selected evaluation area is equal to or larger than the first threshold (step S305). When the density of an elastic wave source is equal to or larger than the first threshold (YES in step S305), the evaluator 402*b* evaluates the selected evaluation area as a soundness area (step S306). The evaluator 402*b* determines whether or not all the evaluation areas have been evaluated (step S307). When all the evaluation areas have been evaluated (YES in step S307), the evaluator 402*b* outputs a result of the evaluation to the display 403.

In the processing of step S307, when all the evaluation areas have not been evaluated (NO in step S307), the evaluator 402*b* executes processing of step S304 and thereafter.

In addition, when the density of an elastic wave source is less than the first threshold in the processing of step S305 (NO in step S305), the evaluator 402*b* evaluates the selected evaluation area as a deteriorated area (step S308).

The structure evaluation system 100*b* configured in this manner evaluates the deterioration state of the structure 50 by correcting the elastic wave source density distribution according to the distance from the installation position of the sensor 20. The density indicated by the elastic wave source density distribution is corrected by correcting the elastic wave source density distribution using a correction coefficient. With such a configuration, it is possible to curb erroneous evaluation due to the installation position of the sensor 20. For this reason, it is possible to improve the evaluation accuracy of the deterioration state of a structure.

Hereinafter, a common modification in each embodiment will be described.

The structure evaluation systems 100, 100*a*, and 100*b* may include three or more sensors 20.

The structure evaluation systems 100, 100*a*, and 100*b* may not include the impacts imparting unit 10. With such a configuration, the impacts 11 to the structure 50 may be manually applied. The impacts 11 manually applied to the structure 50 includes, for example, a spray of water droplets, ice droplets, or solids, consecutive hits with a hammer, heating with laser, and the like.

The evaluation area does not need to be limited to a grid shape as shown in FIG. 2. Specifically, the evaluation area may have any shape as long as an area is equal to or smaller than the size of damage to be detected and includes one or a plurality of positions to which the impacts 11 is applied. For example, the evaluation area may be a circle, a rectangle having a plurality of vertices (for example, an n-polygon (n is an integer of 3 or more)), or an area designated by handwriting. In addition, the evaluation area may be an area that is equal to or smaller than the size of damage to be detected.

Some or all of function units of the structure evaluation apparatus 40 may be included in another housing. For example, the structure evaluation apparatus 40 may include only the evaluator 402, and the position locator 401 and the display 403 may be provided in another housing. With such a configuration, the evaluator 402 acquires the elastic wave source distribution from another housing and evaluates soundness of a structure using the acquired elastic wave source distribution. Then, the evaluator 402 outputs a result of the evaluation to the display 403 provided in another housing.

With such a configuration, a manufacturing cost of the structure evaluation apparatus 40 can be reduced by using existing device for deriving the elastic wave source distribution.

The signal processor 30 may be configured to perform signal processing on an AE source signal whose amplitude value is higher than the first threshold determined to be higher than a noise level among the input AE source signals. Specifically, when a large vibration as compared with the first threshold is first detected, the signal processor 30 determines that a signal for a predetermined time from a time at which the vibration exceeds the first threshold as an elastic wave waveform, and stores an AE source signal whose amplitude value is higher than the first threshold. Then, the signal processor 30 extracts an AE feature amount including information on elastic waves on the basis of data of the elastic wave waveform indicated by the stored AE source signal. Note that the first threshold is set in advance.

The signal processor 30 may be included in the structure evaluation apparatus 40 (or the structure evaluation apparatus 40a or the structure evaluation apparatus 40b). With such a configuration, the signal processor 30 acquires an AE source signal processed by the sensor 20 directly or via a relay device (not shown) from the sensor 20.

In FIG. 1, one signal processor 30 is connected to the plurality of sensors 20-1 to 20-n, but the structure evaluation system 100 (or the structure evaluation system 100a or the structure evaluation system 100b) may include a plurality of signal processors 30, and be configured to include a plurality of sensor units in which each signal processor 30 is connected to each sensor 20.

In addition, the evaluator 402 (or the evaluator 402a or the evaluator 402b) may operate as an output controller. The output controller controls an output unit and outputs a result of the evaluation. Here, the output unit includes the display 403, a communicator, and a printer. When the output unit is a communicator, the output controller controls the communicator and transmits the result of the evaluation to another device. In addition, when the output unit is a printer, the output controller controls the printer and prints the result of the evaluation. Note that the structure evaluation apparatus 40 (or the structure evaluation apparatus 40a or the structure evaluation apparatus 40b) may execute the operation described above by including some or all of the display 403, the communicator, and the printer as output units.

According to at least one embodiment described above, it is possible to improve the evaluation accuracy of the deterioration state of a structure by including a plurality of sensors that detect elastic waves, a position locator that locates an elastic wave sources on the basis of a plurality of elastic waves detected by each of the plurality of sensors, and an evaluator that evaluates the deterioration state of a structure in accordance with an elastic wave source distribution obtained on the basis of the elastic wave sources and a presence or absence of a sensor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A structure evaluation system comprising:
a plurality of sensors detecting elastic waves; and
one or more processor configured to:
locate elastic wave sources on the basis of the elastic waves detected by each of the plurality of sensors;
set a plurality of divided areas by dividing an elastic wave source distribution into the plurality of divided areas which are equal to or smaller than a size of damage that a user wants to detect and include one or more position to which an impact is applied, the elastic wave source distribution indicating the location of the elastic wave sources obtained based on results of locating the elastic wave sources;
compare a feature amount of the elastic waves in each of the plurality of divided areas with one or more criteria determined according to an installation position of the plurality of sensors in the elastic wave source distribution, the feature amount being a density of each of the plurality of divided areas dividing the elastic wave source distribution obtained based on the results of locating the elastic wave sources; and
after the comparison, evaluate a deterioration state of a structure for each of the plurality of divided areas based on the one or more criteria.

2. A structure evaluation system comprising:
a plurality of sensors detecting elastic waves; and
one or more processor configured to:
locate elastic wave sources on the basis of the elastic waves detected by each of the plurality of sensors;
set a plurality of divided areas by dividing an elastic wave source density distribution into the plurality of divided areas which are equal to or smaller than a size of damage that a user wants to detect and include one or more position to which an impact is applied, the elastic wave source density distribution indicating a density of the elastic wave sources obtained based on results of locating the elastic wave sources,
correct a feature amount of the elastic waves in an area, among areas of the elastic wave source density distribution, satisfying a condition, the condition being that the area is a predetermined distance away from an installation position of the plurality of sensors, the feature amount being a density of each of the plurality of divided areas dividing the elastic wave source distribution obtained based on the results of locating the elastic wave sources, and
evaluate a deterioration state of a structure for each the plurality of divided areas using a corrected elastic wave source density distribution.

3. A structure evaluation apparatus comprising:
one or more processor configured to:
locate elastic wave sources on the basis of elastic waves detected by each of a plurality of sensors that detect the elastic waves;
set a plurality of divided areas by dividing an elastic wave source distribution into the plurality of divided areas which are equal to or smaller than a size of damage that a user wants to detect and include one or more position to which an impact is applied, the elastic wave source distribution indicating the location of the elastic wave sources obtained based on results of locating the elastic wave sources;

compare a feature amount of the elastic waves in each of the plurality of divided areas with one or more criteria determined according to an installation position of the plurality of sensors in the elastic wave source distribution, the feature amount being a density of each of the plurality of divided areas dividing the elastic wave source distribution obtained based on the results of locating the elastic wave sources; and after the comparison, evaluate a deterioration state of a structure for each of the plurality of divided areas based on the one or more criteria.

4. A structure evaluation method comprising:

locating elastic wave sources on the basis of elastic waves detected by each of a plurality of sensors that detect the elastic waves;

setting a plurality of divided areas by dividing an elastic wave source distribution into the plurality of divided areas which are equal to or smaller than a size of damage that a user wants to detect and include one or more position to which an impact is applied, the elastic wave source distribution indicating the location of the elastic wave sources obtained based on results of locating the elastic wave sources;

comparing a feature amount of the elastic waves in each of the plurality of divided areas with one or more criteria determined according to an installation position of the plurality of sensors in the elastic wave source distribution, the feature amount being a density of each of the plurality of divided areas dividing the elastic wave source distribution obtained based on the results of locating the elastic wave sources; and after the comparison, evaluating a deterioration state of a structure for each of the plurality of divided areas based on the one or more criteria.

5. A structure evaluation apparatus comprising:

one or more processor configured to:

locate elastic wave sources on the basis of elastic waves detected by each of a plurality of sensors that detect the elastic waves;

set a plurality of divided areas by dividing an elastic wave source density distribution into the plurality of divided areas which are equal to or smaller than a size of damage that a user wants to detect and include one or more position to which an impact is applied, the elastic wave source density distribution indicating a density of the elastic wave sources obtained based on results of locating the elastic wave sources, correct a feature amount of the elastic waves in an area, among areas of the elastic wave source density distribution, satisfying a condition, the condition being that the area is a predetermined distance away from an installation position of the plurality of sensors, the feature amount being a density of each of the plurality of divided areas dividing the elastic wave source distribution obtained based on the results of locating the elastic wave sources, and evaluate a deterioration state of a structure for each the plurality of divided areas using a corrected elastic wave source density distribution.

6. A structure evaluation method comprising:

locating elastic wave sources on the basis of elastic waves detected by each of a plurality of sensors that detect the elastic waves;

setting a plurality of divided areas by dividing an elastic wave source density distribution into the plurality of divided areas which are equal to or smaller than a size of damage that a user wants to detect and include one or more position to which an impact is applied, the elastic wave source density distribution indicating a density of the elastic wave sources obtained based on results of locating the elastic wave sources, correcting a feature amount of the elastic waves in an area, among areas of the elastic wave source density distribution, satisfying a condition, the condition being that the area is a predetermined distance away from an installation position of the plurality of sensors, the feature amount being a density of each of the plurality of divided areas dividing the elastic wave source distribution obtained based on the results of locating the elastic wave sources, and evaluating a deterioration state of a structure for each the plurality of divided areas using a corrected elastic wave source density distribution.

\* \* \* \* \*